United States Patent
Tiwan

(10) Patent No.: US 11,893,586 B2
(45) Date of Patent: *Feb. 6, 2024

(54) METHOD, SYSTEM, AND COMPUTER PROGRAM PRODUCT FOR PROCESSING A POTENTIALLY FRAUDULENT TRANSACTION

(71) Applicant: Visa International Service Association, San Francisco, CA (US)

(72) Inventor: Deepam Tiwan, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 17/484,677

(22) Filed: Sep. 24, 2021

(65) Prior Publication Data
US 2022/0012744 A1    Jan. 13, 2022

Related U.S. Application Data

(63) Continuation of application No. 16/713,258, filed on Dec. 13, 2019, now Pat. No. 11,157,914.

(51) Int. Cl.
*G06Q 40/00* (2023.01)
*G06Q 20/40* (2012.01)
*G06N 5/025* (2023.01)

(52) U.S. Cl.
CPC .......... *G06Q 20/4016* (2013.01); *G06N 5/025* (2013.01)

(58) Field of Classification Search
CPC .............................. G06Q 20/4016; G06N 5/025
See application file for complete search history.

(56) References Cited

U.S. PATENT DOCUMENTS 6,601,048 B1    7/2003    Gavan et al.
8,856,165 B1    10/2014    Cierniak
(Continued)

FOREIGN PATENT DOCUMENTS

| CN | 103714479 | * | 4/2014 | ............. G06Q 40/00 |
| EP | 1427244 A2 | * | 6/2004 | ......... G06Q 20/4016 |

(Continued)

OTHER PUBLICATIONS

Ranjit Bose, "Intelligent Technologies for Managing Fraud and Identity Theft," Proceedings of the Third International Conference on Information Technology: New Generations, 2006 (Year: 2006).*

(Continued)

*Primary Examiner* — Hani M Kazimi
*Assistant Examiner* — William B. Bunker
(74) *Attorney, Agent, or Firm* — The Webb Law Firm

(57) ABSTRACT

A method for processing a potentially fraudulent electronic payment transaction includes: receiving a first fraud detection rule configured to identify a potentially fraudulent electronic payment transaction; storing the first fraud detection rule in a fraud rules database; receiving a transaction request message; generating and storing a first case record associated with the first transaction in a case management database; receiving an updated fraud detection rule superseding the first fraud detection rule; applying the updated fraud detection rule to the first transaction to determine whether the first transaction does not satisfy the at least one updated fraud detection rule; and deleting the first case record from the case management database before the first transaction is further analyzed for fraud.

19 Claims, 4 Drawing Sheets

(56) References Cited

U.S. PATENT DOCUMENTS

| | | |
|---|---|---|
| 8,924,279 B2 | 12/2014 | Liu et al. |
| 9,824,207 B1 | 11/2017 | Kane-Parry et al. |
| 10,204,374 B1 | 2/2019 | Holan et al. |
| 10,699,276 B1* | 6/2020 | Smith ............... G06Q 20/4014 |
| 10,949,854 B1 | 3/2021 | Kramme et al. |
| 10,956,911 B2 | 3/2021 | Knoblauch |
| 11,379,855 B1* | 7/2022 | Anderson .............. G06N 20/00 |
| 2003/0153299 A1 | 8/2003 | Perfit et al. |
| 2008/0109392 A1* | 5/2008 | Nandy ................... G06N 5/027 |
| | | 706/47 |
| 2008/0270171 A1* | 10/2008 | Price ...................... G06Q 10/06 |
| | | 705/1.1 |
| 2008/0270303 A1* | 10/2008 | Zhou ...................... G06Q 20/40 |
| | | 705/44 |
| 2009/0222364 A1 | 9/2009 | McGlynn et al. |
| 2010/0005029 A1 | 1/2010 | Nelsen et al. |
| 2012/0158585 A1 | 6/2012 | Ganti |
| 2013/0024361 A1* | 1/2013 | Choudhuri ............. G06Q 40/02 |
| | | 705/39 |
| 2013/0253965 A1* | 9/2013 | Joseph ............... G06Q 20/4016 |
| | | 705/5 |
| 2014/0089192 A1* | 3/2014 | Boding .............. G06Q 20/4016 |
| | | 705/44 |
| 2014/0122336 A1 | 5/2014 | Rich et al. |
| 2015/0012399 A1 | 1/2015 | Ceribelli et al. |
| 2015/0039513 A1 | 2/2015 | Adjaoute |
| 2015/0170147 A1 | 6/2015 | Geckle et al. |
| 2015/0206146 A1 | 7/2015 | Siddens |
| 2019/0141183 A1 | 5/2019 | Chandrasekaran et al. |
| 2020/0067861 A1 | 2/2020 | Leddy et al. |
| 2020/0334679 A1* | 10/2020 | Sandepudi ......... G06Q 20/4016 |
| 2020/0372510 A1* | 11/2020 | Baruvoori .......... G06Q 20/4012 |

FOREIGN PATENT DOCUMENTS

| | | |
|---|---|---|
| EP | 1427244 A2 | 6/2004 |
| WO | 2018193085 A1 | 10/2018 |
| WO | WO-2018193085 A1 * | 10/2018 ......... G06Q 20/4016 |

OTHER PUBLICATIONS

Ayofe et al., "Framework for Computer Aided Investigation of ATM Fraud in Nigeria," The Pacific Journal of Science and Technology, vol. 11, No. 1, May 2010 (Year: 2010).*

Ayofe et al., "Framework for Computer Aided Investigation of ATM Fraud in Nigeria," The Pacific Journal of Science and Technology, May 2010, pp. 356-361, vol. 11, No. 1.

Bose, "Intelligent Technologies for Managing Fraud and Identity Theft," Proceedings of the Third International Conference on Information Technology: New Generations, 2006, 6 pages.

* cited by examiner

METHOD, SYSTEM, AND COMPUTER PROGRAM PRODUCT FOR PROCESSING A POTENTIALLY FRAUDULENT TRANSACTION

CROSS REFERENCE TO RELATED APPLICATION

This application is a continuation of U.S. patent application Ser. No. 16/713,258, filed Dec. 13, 2019, the disclosure of which is incorporated herein by reference in its entirety.

BACKGROUND

1. Technical Field

The disclosure relates to detecting fraudulent transactions and, in some non-limiting embodiments or aspects, to a method, system, and computer program product for processing potentially fraudulent transactions.

2. Technical Considerations

Issuing banks implement fraud detection rules to enable electronic payment processing systems to detect potentially fraudulent payment transactions during payment processing. Certain rules allow for automatic decline of the transaction, while others create cases for further analysis as to whether the transaction is fraudulent. In the case creation rule scenario, a fraud analysis system may further process the potentially fraudulent transaction to determine whether the transaction is fraudulent. This can include communication with the user initiating the transaction to determine whether the transaction is fraudulent.

Fraud detection rules are oftentimes not static and change from time to time to accommodate changes in fraudulent behavior, issuer bank policy, and the like. Updates to fraud detection rules can supersede existing fraud detection rules. Existing systems only enable these updated fraud detection rules to be applied to payment transactions initiated after the updated rules have gone into effect. In the case creation rules scenario, those transactions in the queue of a fraud analysis system, not yet fully processed, are still processed according to the superseded fraud detection rules in the existing systems. This leads to many cases no longer considered fraudulent according to the updated fraud detection rules nonetheless being further processed by the fraud analysis system.

SUMMARY

Accordingly, and generally, provided is an improved method, system, and computer program product for processing a potentially fraudulent electronic payment transaction.

According to some non-limiting embodiments or aspects, provided is a method for processing a potentially fraudulent electronic payment transaction comprising: receiving, from an issuer system and with at least one processor, at least one first fraud detection rule configured to identify a potentially fraudulent electronic payment transaction; storing, with at least one processor, the at least one first fraud detection rule in a fraud rules database; receiving, from a merchant system and with at least one processor, a transaction request message associated with a first transaction; in response to determining, with at least one processor, that the first transaction is a potentially fraudulent transaction based on the first transaction satisfying the at least one first fraud detection rule stored in the fraud rules database, generating and storing, with at least one processor, a first case record associated with the first transaction in a case management database to cause the first transaction to be further analyzed for potential fraud; receiving, from an issuer system and with at least one processor, at least one updated fraud detection rule superseding the at least one first fraud detection rule; in response to receiving the at least one updated fraud detection rule and before the first transaction is further analyzed for fraud, applying, with at least one processor, the at least one updated fraud detection rule to the first transaction to determine whether the first transaction does not satisfy the at least one updated fraud detection rule; and in response to determining that the first transaction does not satisfy the at least one updated fraud detection rule, deleting the first case record from the case management database before the first transaction is further analyzed for fraud.

In some non-limiting embodiments or aspects, the first case record may be deleted prior to any manual intervention to further analyze the first transaction for fraud. In some non-limiting embodiments or aspects, the at least one updated fraud detection rule may be different from the at least one first fraud detection rule. In some non-limiting embodiments or aspects, the at least one updated fraud detection rule may be received after the first case record has been generated and stored. In some non-limiting embodiments or aspects, the method may further include, in response to determining that the first transaction does not satisfy the at least one updated fraud detection rule, automatically determining, with at least one processor, that the first transaction is a non-fraudulent transaction. In some non-limiting embodiments or aspects, the method may further include, in response to determining that the first transaction does not satisfy the at least one updated fraud detection rule, determining, with at least one processor, that the first transaction satisfies at least one second updated fraud detection rule, where the at least one second updated fraud detection rule includes an automatic decline fraud detection rule; and automatically determining, with at least one processor, that the first transaction is a fraudulent transaction. In some non-limiting embodiments or aspects, the at least one updated fraud detection rule may include a case creation fraud detection rule.

According to some non-limiting embodiments or aspects, provided is a system for processing a potentially fraudulent electronic payment transaction comprising: a case management database including a plurality of case records associated with potentially fraudulent transactions to be reviewed to determine whether the transactions are fraudulent transactions; a fraud rules database for storing a plurality of fraud detection rules; and at least one processor programmed or configured to: receive, from an issuer system, at least one first fraud detection rule configured to identify a potentially fraudulent electronic payment transaction; store the at least one first fraud detection rule in the fraud rules database; receive, from a merchant system, a transaction request message associated with a first transaction; in response to determining that the first transaction is a potentially fraudulent transaction based on the first transaction satisfying the at least one first fraud detection rule stored in the fraud rules database, generate and store a first case record associated with the first transaction in the case management database to cause the first transaction to be further analyzed for potential fraud; receive, from an issuer system, at least one updated fraud detection rule superseding the at least one first fraud detection rule; in response to receiving the at least one updated fraud detection rule and before the first transaction is further analyzed for fraud, apply the at least one updated fraud detection rule to the first transaction to determine whether the first transaction does not satisfy the at least one updated fraud detection rule; and in response to determining that the first transaction does not satisfy the at least one updated fraud detection rule, delete the first case record from the case management database before the first transaction is further analyzed for fraud.

In some non-limiting embodiments or aspects, the first case record may be deleted prior to any manual intervention to further analyze the first transaction for fraud. In some non-limiting embodiments or aspects, the at least one updated fraud detection rule may be different from the at least one first fraud detection rule. In some non-limiting embodiments or aspects, the at least one updated fraud detection rule may be received after the first case record has been generated and stored. In some non-limiting embodiments or aspects, the at least one processor may be programmed or configured to: in response to determining that the first transaction does not satisfy the at least one updated fraud detection rule, automatically determine that the first transaction is a non-fraudulent transaction. In some non-limiting embodiments or aspects, the at least one processor may be programmed or configured to: in response to determining that the first transaction does not satisfy the at least one updated fraud detection rule, determine that the first transaction satisfies at least one second updated fraud detection rule, where the at least one second updated fraud detection rule includes an automatic decline fraud detection rule; and automatically determine that the first transaction is a fraudulent transaction. In some non-limiting embodiments or aspects, the at least one updated fraud detection rule may include a case creation fraud detection rule.

According to some non-limiting embodiments or aspects, provided is a computer program product for processing a potentially fraudulent electronic payment transaction comprising at least one non-transitory computer-readable medium including one or more instructions that, when executed by at least one processor, cause the at least one processor to: receive, from an issuer system, at least one first fraud detection rule configured to identify a potentially fraudulent electronic payment transaction; store the at least one first fraud detection rule in a fraud rules database; receive, from a merchant system, a transaction request message associated with a first transaction; in response to determining that the first transaction is a potentially fraudulent transaction based on the first transaction satisfying the at least one first fraud detection rule stored in the fraud rules database, generate and store a first case record associated with the first transaction in a case management database to cause the first transaction to be further analyzed for potential fraud; receive, from an issuer system, at least one updated fraud detection rule superseding the at least one first fraud detection rule; in response to receiving the at least one updated fraud detection rule and before the first transaction is further analyzed for fraud, apply the at least one updated fraud detection rule to the first transaction to determine whether the first transaction does not satisfy the at least one updated fraud detection rule; and in response to determining that the first transaction does not satisfy the at least one updated fraud detection rule, delete the first case record from the case management database before the first transaction is further analyzed for fraud.

In some non-limiting embodiments or aspects, the first case record may be deleted prior to any manual intervention to further analyze the first transaction for potential fraud. In some non-limiting embodiments or aspects, the at least one updated fraud detection rule may be different from the at least one first fraud detection rule. In some non-limiting embodiments or aspects, the at least one updated fraud detection rule may be received after the first case record has been generated and stored. In some non-limiting embodiments or aspects, the one or more instructions may be further configured to cause the at least one processor to: in response to determining that the first transaction does not satisfy the at least one updated fraud detection rule, automatically determine that the first transaction is a non-fraudulent transaction. In some non-limiting embodiments or aspects, the one or more instructions may be further configured to cause the at least one processor to: in response to determining that the first transaction does not satisfy the at least one updated fraud detection rule, determine that the first transaction satisfies at least one second updated fraud detection rule, where the at least one second updated fraud detection rule includes an automatic decline fraud detection rule; and automatically determine that the first transaction is a fraudulent transaction. In some non-limiting embodiments or aspects, the at least one updated fraud detection rule may include a case creation fraud detection rule.

Further non-limiting embodiments or aspects are set forth in the following numbered clauses:

Clause 1: A method for processing a potentially fraudulent electronic payment transaction, comprising: receiving, from an issuer system and with at least one processor, at least one first fraud detection rule configured to identify a potentially fraudulent electronic payment transaction; storing, with at least one processor, the at least one first fraud detection rule in a fraud rules database; receiving, from a merchant system and with at least one processor, a transaction request message associated with a first transaction; in response to determining, with at least one processor, that the first transaction is a potentially fraudulent transaction based on the first transaction satisfying the at least one first fraud detection rule stored in the fraud rules database, generating and storing, with at least one processor, a first case record associated with the first transaction in a case management database to cause the first transaction to be further analyzed for potential fraud; receiving, from an issuer system and with at least one processor, at least one updated fraud detection rule superseding the at least one first fraud detection rule; in response to receiving the at least one updated fraud detection rule and before the first transaction is further analyzed for fraud, applying, with at least one processor, the at least one updated fraud detection rule to the first transaction to determine whether the first transaction does not satisfy the at least one updated fraud detection rule; and in response to determining that the first transaction does not satisfy the at least one updated fraud detection rule, deleting the first case record from the case management database before the first transaction is further analyzed for fraud.

Clause 2: The method of clause 1, wherein the first case record is deleted prior to any manual intervention to further analyze the first transaction for fraud.

Clause 3: The method of clause 1 or 2, wherein the at least one updated fraud detection rule is different from the at least one first fraud detection rule.

Clause 4: The method of any of clauses 1-3, wherein the at least one updated fraud detection rule is received after the first case record has been generated and stored.

Clause 5: The method of any of clauses 1-4, further comprising: in response to determining that the first transaction does not satisfy the at least one updated fraud detection rule, automatically determining, with at least one processor, that the first transaction is a non-fraudulent transaction.

Clause 6: The method of any of clauses 1-5, further comprising: in response to determining that the first transaction does not satisfy the at least one updated fraud detection rule, determining, with at least one processor, that the first transaction satisfies at least one second updated fraud detection rule, wherein the at least one second updated fraud detection rule comprises an automatic decline fraud detection rule; and automatically determining, with at least one processor, that the first transaction is a fraudulent transaction.

Clause 7: The method of any of clauses 1-6, wherein the at least one updated fraud detection rule comprises a case creation fraud detection rule.

Clause 8: A system for processing a potentially fraudulent electronic payment transaction, comprising: a case management database comprising a plurality of case records associated with potentially fraudulent transactions to be reviewed to determine whether the transactions are fraudulent transactions; a fraud rules database for storing a plurality of fraud detection rules; and at least one processor programmed or configured to: receive, from an issuer system, at least one first fraud detection rule configured to identify a potentially fraudulent electronic payment transaction; store the at least one first fraud detection rule in the fraud rules database; receive, from a merchant system, a transaction request message associated with a first transaction; in response to determining that the first transaction is a potentially fraudulent transaction based on the first transaction satisfying the at least one first fraud detection rule stored in the fraud rules database, generate and store a first case record associated with the first transaction in the case management database to cause the first transaction to be further analyzed for potential fraud; receive, from an issuer system, at least one updated fraud detection rule superseding the at least one first fraud detection rule; in response to receiving the at least one updated fraud detection rule and before the first transaction is further analyzed for fraud, apply the at least one updated fraud detection rule to the first transaction to determine whether the first transaction does not satisfy the at least one updated fraud detection rule; and in response to determining that the first transaction does not satisfy the at least one updated fraud detection rule, delete the first case record from the case management database before the first transaction is further analyzed for fraud.

Clause 9: The system of clause 8, wherein the first case record is deleted prior to any manual intervention to further analyze the first transaction for fraud.

Clause 10: The system of clause 8 or 9, wherein the at least one updated fraud detection rule is different from the at least one first fraud detection rule.

Clause 11: The system of any of clauses 8-10, wherein the at least one updated fraud detection rule is received after the first case record has been generated and stored.

Clause 12: The system of any of clauses 8-11, wherein the at least one processor is programmed or configured to: in response to determining that the first transaction does not satisfy the at least one updated fraud detection rule, automatically determine that the first transaction is a non-fraudulent transaction.

Clause 13: The system of any of clauses 8-12, wherein the at least one processor is programmed or configured to: in response to determining that the first transaction does not satisfy the at least one updated fraud detection rule, determine that the first transaction satisfies at least one second updated fraud detection rule, wherein the at least one second updated fraud detection rule comprises an automatic decline fraud detection rule; and automatically determine that the first transaction is a fraudulent transaction.

Clause 14: The system of any of clauses 8-13, wherein the at least one updated fraud detection rule comprises a case creation fraud detection rule.

Clause 15: A computer program product for processing a potentially fraudulent electronic payment transaction, the computer program product comprising at least one non-transitory computer-readable medium including one or more instructions that, when executed by at least one processor, cause the at least one processor to: receive, from an issuer system, at least one first fraud detection rule configured to identify a potentially fraudulent electronic payment transaction; store the at least one first fraud detection rule in a fraud rules database; receive, from a merchant system, a transaction request message associated with a first transaction; in response to determining that the first transaction is a potentially fraudulent transaction based on the first transaction satisfying the at least one first fraud detection rule stored in the fraud rules database, generate and store a first case record associated with the first transaction in a case management database to cause the first transaction to be further analyzed for potential fraud; receive, from an issuer system, at least one updated fraud detection rule superseding the at least one first fraud detection rule; in response to receiving the at least one updated fraud detection rule and before the first transaction is further analyzed for fraud, apply the at least one updated fraud detection rule to the first transaction to determine whether the first transaction does not satisfy the at least one updated fraud detection rule; and in response to determining that the first transaction does not satisfy the at least one updated fraud detection rule, delete the first case record from the case management database before the first transaction is further analyzed for fraud.

Clause 16: The computer program product of clause 15, wherein the first case record is deleted prior to any manual intervention to further analyze the first transaction for potential fraud.

Clause 17: The computer program product of clause 15 or 16, wherein the at least one updated fraud detection rule is different from the at least one first fraud detection rule.

Clause 18: The computer program product of any of clauses 15-17, wherein the at least one updated fraud detection rule is received after the first case record has been generated and stored.

Clause 19: The computer program product of any of clauses 15-18, wherein the one or more instructions are further configured to cause the at least one processor to: in response to determining that the first transaction does not satisfy the at least one updated fraud detection rule, automatically determine that the first transaction is a non-fraudulent transaction.

Clause 20: The computer program product of any of clauses 15-19, wherein the one or more instructions are further configured to cause the at least one processor to: in response to determining that the first transaction does not satisfy the at least one updated fraud detection rule, determine that the first transaction satisfies at least one second updated fraud detection rule, wherein the at least one second updated fraud detection rule comprises an automatic decline fraud detection rule; and automatically determine that the first transaction is a fraudulent transaction.

Clause 21: The computer program product of any of clauses 15-20, wherein the at least one updated fraud detection rule comprises a case creation fraud detection rule.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. One or more embodiments are now described, by way of example only, with reference to the accompanying figures wherein like reference numerals represent like elements and in which:

DETAILED DESCRIPTION

Figure 1:
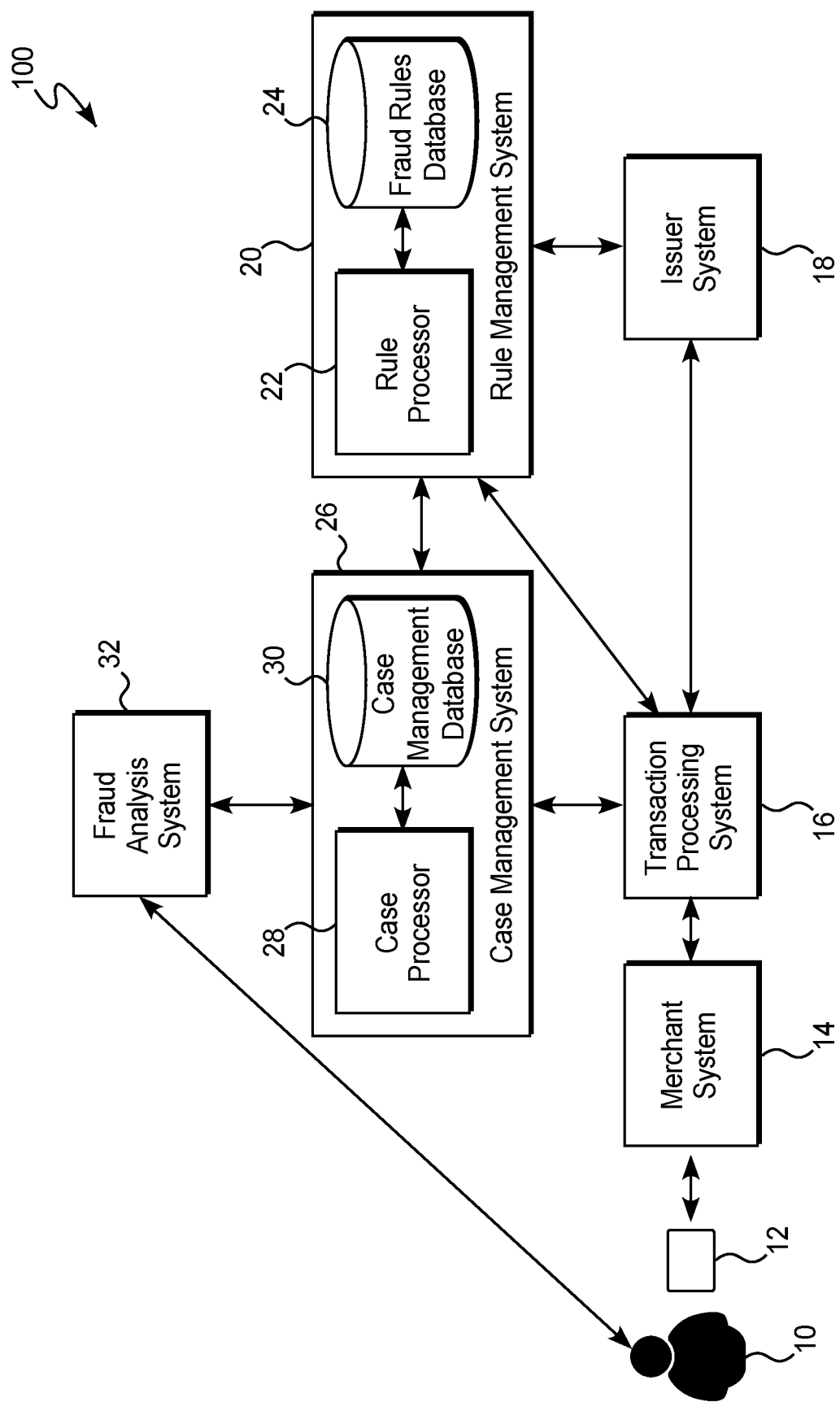
FIG. 1 shows a system for processing a potentially fraudulent electronic payment transaction according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a payment device (e.g., a portable payment instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "acquirer" may refer to an entity licensed by the transaction service provider and approved by the transaction service provider to originate transactions (e.g., payment transactions) using a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a payment device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like.

In some non-limiting embodiments, an acquirer may be a financial institution, such as a bank.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "issuer institution" may refer to one or more entities, such as a bank, that provide accounts to users for conducting transactions (e.g., payment transactions), such as initiating credit and/or debit payments. For example, an issuer institution may provide an account identifier, such as a PAN, to a user that uniquely identifies one or more accounts associated with that user. The account identifier may be embodied on a payment device, such as a physical financial instrument, e.g., a payment card, and/or may be electronic and used for electronic payments. The term "issuer system" refers to one or more computer systems, computing devices, software applications, and/or the like operated by or on behalf of an issuer institution, such as a server computer executing one or more software applications. For example, an issuer system may include one or more authorization servers for authorizing a transaction, one or more authentication servers for authenticating a transaction, and/or one or more databases of account data. An issuer system may include a separate or integrated issuer authentication system, such as an Access Control Server (ACS), for authenticating online transactions. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to users (e.g., users) based on a transaction (e.g., a payment transaction). The term "merchant system" may refer to one or more computer systems, computing devices, and/or software applications operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like, operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

Non-limiting embodiments or aspects of the present disclosure are directed to a method, system, and computer program product for processing a potentially fraudulent electronic payment transaction. Non-limiting embodiments or aspects enable updated fraud detection rules to be applied to case records associated with case creation rules and stored in a case management system, where the case records were created in response to the transaction associated therewith satisfying a previous fraud detection rule. The system is thus enabled to delete case records (so as to prevent further processing thereof) stored in the case management system that are associated with previous fraud detection rules that have been superseded or otherwise are no longer applicable in determining a fraudulent transaction. This allows the load on the fraud analysis system to be reduced. The system allows for the resources utilized for determining fraudulent transactions to be applied toward only those transactions that are associated with currently applicable fraud detection rules, resulting in an increased efficiency in the use of computing and system resources. Non-limiting embodiments or aspects enable the status of case records stored in the case management system to be automatically updated in response to new fraud detection rules being implemented by the issuer system. Non-limiting embodiments or aspects allow the system to more accurately determine whether a potentially fraudulent transaction is fraudulent, increasing the reliability of the system and allowing the system to be more accurate in its identification of fraudulent transactions.

Referring to FIG. 1, a system 100 is shown for processing a potentially fraudulent electronic payment transaction according to some non-limiting embodiments or aspects. In the system 100, a user 10 (e.g., a consumer) may initiate an electronic payment transaction using a payment device 12 (used interchangeably herein with "user device 12") with a merchant system 14 operated by or on behalf of a merchant, in order to purchase goods and/or services from the merchant. In some non-limiting embodiments or aspects, the payment device 12 may include a computing device capable of sending and/or receiving communications. The electronic payment transaction initiated with the payment device 12 may be processed to completion (e.g., authorized, cleared, settled) over an electronic payment processing system including the merchant system, a transaction processing system 16 operated by or on behalf of a transaction service provider and/or an issuer system 18 operated by or on behalf of an issuer. The transaction service provider and the issuer may be associated with the payment device 12 of the user 10. The issuer may be the issuing bank which issued the payment device 12 to the user. Other systems/entities may be included in the processing of the electronic payment transaction over the electronic payment processing system, such as an acquirer system operated by or on behalf of an acquirer, a payment gateway system operated by or on behalf of a payment gateway, and other entities known as being included in processing electronic payment transactions.

With continued reference to FIG. 1, in some non-limiting embodiments or aspects, during processing of the electronic payment transaction, the system 100 may identify whether the electronic payment transaction is a potentially fraudulent electronic payment transaction. The system 100 may include a rule management system 20 operated by or on behalf of the issuer and/or the transaction service provider to enable the determination of whether the electronic payment transaction is a fraudulent electronic payment transaction. The rule management system 20 may include a rule processor 22 for communicating with other computing devices in the system 100 (e.g., the transaction processing system 16, the issuer system 18, and the like) to determine whether the electronic payment transaction is a fraudulent electronic payment transaction. The rule management system 20 may include a fraud rules database 24 for storing a plurality of fraud detection rules configured to identify a potentially fraudulent electronic payment transaction.

In some non-limiting embodiments or aspects, the issuer system 18 and/or the transaction processing system 16 may generate fraud detection rules configured to identify potentially fraudulent electronic payment transaction. This may include analyzing historical transaction data associated with previously processed electronic payment transactions to detect fraud patterns. Artificial intelligence and/or machine learning may be used to analyze the historical transaction data and determine fraud detection rules configured to identify potentially fraudulent electronic payment transactions. In response to generating the fraud detection rules, the issuer system 18 and/or the transaction processing system 16 may communicate the fraud detection rules to the rule management system 20. For example, the rule processor 22 may receive the fraud detection rules and store the fraud detection rules in the fraud rules database 24. The fraud detection rules may be at least partially analyzed against the electronic payment transaction prior to authorization of the electronic payment transaction to determine whether the electronic payment transaction is potentially fraudulent.

The fraud detection rules may include automatic decline fraud detection rules and/or case creation fraud detection rules. An automatic decline fraud detection rule is a fraud detection rule in which, in response to the automatic decline fraud detection rule being satisfied by the electronic payment transaction, the electronic payment transaction is automatically and in near real-time declined. The automatic decline fraud detection rule may automatically terminate further processing of the electronic payment transaction, such that the transaction is not authorized, cleared, or settled. A case creation fraud detection rule is a fraud detection rule in which, in response to the case creation fraud detection rule being satisfied by the electronic payment transaction, the electronic payment transaction is not automatically declined, but a case record may be generated and stored for the electronic payment transaction. The case record may indicate that the electronic payment transaction is a potentially fraudulent electronic payment transaction according to the case creation rule, but that further analysis is required to determine whether the transaction is fraudulent. The case record may contain at least one of: an indication of the case creation fraud detection rule satisfied by the electronic payment transaction, transaction data associated with the electronic payment transaction (e.g., transaction data associated with ISO 8583), and/or data indicating next steps to be taken to process the case record. The generated case record may be further analyzed at a later time during and/or after the processing of the electronic payment transaction. The electronic payment processing system may authorize and/or clear and/or settle the electronic payment transaction which satisfies the case creation fraud detection rule; however the further analysis may determine that the electronic payment transaction is fraudulent, such that the electronic payment processing system may then take the necessary action on the at least partially processed electronic payment transaction, such as declining the transaction at a later time, reversing any of the clearing and/or the settling activity, refunding the user, and/or the like.

The further analysis of the potentially fraudulent electronic payment transaction (as identified by at least one case creation fraud detection rule) prompted by the generated case record may include any action suitable for determining whether the electronic payment transaction is a fraudulent electronic payment transaction. This may include at least one processor of the issuer and/or the transaction service provider further analyzing the electronic payment transaction, such as based on historical transaction data specific to the user associated with the transaction, historical transaction data of a plurality of users (e.g., to detect general fraud patterns), and the like. This may include automatically transmitting a communication to the user or computing device thereof (e.g., the user device 12 in the case that the user device is a computing device) to inquire whether the user actually initiated the electronic payment transaction and receiving a response indicating whether the transaction is fraudulent or non-fraudulent. This may include the case record being processed by a customer service representative of the issuer and/or the transaction service provider to determine whether the electronic payment transaction is a potentially fraudulent electronic payment transaction.

With continued reference to FIG. 1, in some non-limiting embodiments or aspects, as previously discussed the rule management system 20 and/or the transaction processing system 16, and/or the issuer system 18 may determine that the electronic payment transaction satisfies a case creation fraud detection rule. In response to this determination, at least one of the rule management system 20 and/or the transaction processing system 16, and/or the issuer system 18 may communicate with a case management system 26 operated by or on behalf of the issuer and/or the transaction service provider, to cause the case management system 26 to generate the case record associated with the electronic payment transaction, as previously described. For example, a case processor 28 may generate the case record and store the case record in a case management database 30. The case management database 30 may contain a plurality of case records associated with a plurality of electronic payment transactions which satisfied case creation fraud detection rules. The case management database 30 may function as a queue for a fraud analysis system 32 operated by or on behalf of the issuer or transaction service provider. The fraud analysis system 32 may receive case records stored in the case management database 30 to perform the further analysis as previously described. Therefore, for electronic payment transactions which satisfy a case creation fraud detection rule and result in the generation and storage of a case record, there exists a pendency period during which the case record remains unresolved and stored in the case management database 30 until the fraud analysis system 32 further analyzes the electronic payment transaction.

In some non-limiting embodiments or aspects, the fraud analysis system 32 may determine that the electronic payment transaction is non-fraudulent, such that processing of the electronic payment transaction is allowed to continue to completion, or certain steps are not taken to reverse the completed processing of the electronic payment transaction. The fraud analysis system 32 may determine that the electronic payment transaction is fraudulent, such that processing of the electronic payment transaction is terminated and/or reversed, or the appropriate action is taken to redress the situation. After further analysis of the case record by the fraud analysis system 32, the case record may be removed from the queue.

Figure 2:
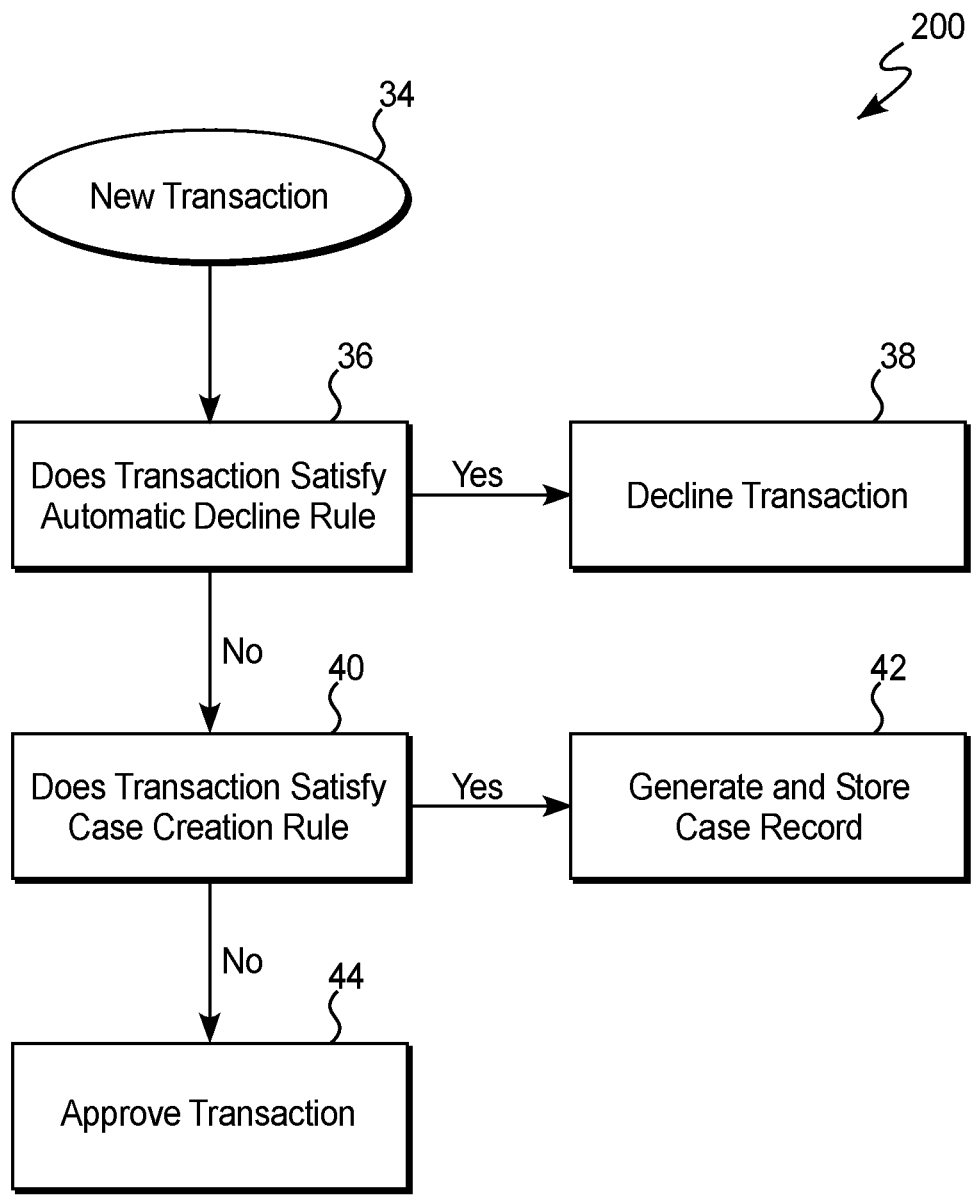
FIG. 2 shows a step diagram of method for determining whether to approve or decline an electronic payment transaction based on fraud detection rules according to some non-limiting embodiments or aspects.

Referring to FIG. 2, a method 200 is shown for determining whether an electronic payment transaction is potentially fraudulent according to some non-limiting embodiments or aspects. At a step 34, the system 100 (from FIG. 1) may receive a new electronic payment transaction. At a step 36, the system 100 may determine whether the electronic payment transaction satisfies at least one automatic decline fraud detection rule. At a step 38, the system 100 may automatically decline the electronic payment transaction in response to determining that the electronic payment transaction satisfies at least one automatic decline fraud detection rule.

At a step 40, the system 100 may determine whether the electronic payment transaction satisfies at least one case creation fraud detection rule. At a step 42, the system 100 may automatically generate and store a case record associated with the electronic payment transaction in response to determining that the electronic payment transaction satisfies at least one case creation fraud detection rule.

At a step 44, in response to determining that the electronic payment transaction does not satisfy an automatic decline fraud detection rule or a case creation fraud detection rule, the system 100 may approve the electronic payment transaction with respect to fraud detection rules. Approving the electronic payment transaction with respect to fraud detection rules may indicate that the electronic payment transaction is not considered a potentially fraudulent electronic payment transaction by the system 100; however, the electronic payment transaction may still under go the authorization decision process by the issuer system 18 (described hereinafter), or any other required processing, before the electronic payment transaction is approved for processing to completion.

Referring again to FIG. 1, in some non-limiting embodiments or aspects, the user 10 may initiate an electronic payment transaction using the payment device 12 with the merchant system 14. The merchant system 14 may generate and communicate a transaction request message associated with the electronic payment transaction to the transaction processing system 16. The transaction processing system 16 may generate and communicate an authorization request message to the issuer system 18 to cause the issuer system 18 to determine an authorization decision for the electronic payment transaction. The authorization decision may be to authorize, authorize in part, or decline the electronic payment transaction. The issuer system 18 may communicate the authorization decision to the transaction processing system 16 by communicating an authorization response message containing the authorization decision to the transaction processing system 16. The transaction processing system 16 may communicate the authorization decision to the merchant system 14 via a transaction response message containing the authorization decision.

In some non-limiting embodiments or aspects, the transaction processing system 16 and/or the issuer system 18 may communicate with the rule management system 20 to determine whether the electronic payment transaction is a potentially fraudulent electronic payment transaction (based on whether the electronic payment transaction satisfies at least one of the fraud detection rules stored in the fraud rules database 24). In some non-limiting embodiments or aspects, the transaction processing system 16 and/or the issuer system 18 may communicate with the rule management system 20 prior to the issuer system 18 making an authorization decision. In some non-limiting embodiments or aspects, the transaction processing system 16 may communicate with the rule management system 20 prior to communicating the authorization request message, concurrently with communicating the authorization request message, or after communicating the authorization request message. In some non-limiting embodiments or aspects, the transaction processing system 16 may communicate with the rule management system 20 prior to communicating the authorization request message.

With continued reference to FIG. 1, in some non-limiting embodiments or aspects, in response to determining that the electronic payment transaction satisfies an automatic decline fraud detection rule from the fraud rules database 24, the automatic decline fraud detection rule may be terminated.

With continued reference to FIG. 1, in some non-limiting embodiments or aspects, in response to determining that the electronic payment transaction satisfies a case creation fraud detection rule from the fraud rules database 24, a case record associated with the electronic payment transaction may be generated. In some non-limiting embodiments or aspects, at least one of the transaction processing system 16, the issuer system 18, and/or the rule management system 20 may generate the case record and communicate the case record to the case management system 26. In some non-limiting embodiments or aspects, the case management system 26 may generate and store a case record in the case management database 30 associated with the electronic payment transaction in response to receiving a communication (e.g., from the rule management system 20, the issuer system 18, and/or the transaction processing system 16) that the electronic payment transaction satisfies a case creation fraud detection rule.

With continued reference to FIG. 1, in some non-limiting embodiments or aspects, the system 100 may process a plurality of electronic payment transactions initiated by a plurality of users with a plurality of merchant systems (of a plurality of merchants), such that the case management system 30 stores a plurality of case records associated with electronic payment transactions which satisfy at least one case creation fraud detection rule. The fraud analysis system 32 may further analyze the plurality of case records stored in the case management database 30, in turn.

With continued reference to FIG. 1, in some non-limiting embodiments or aspects, the rule management system 20 may receive at least one updated fraud detection rule from the issuer system 18 and/or the transaction processing system 16. The updated fraud detection rules may be received after the original fraud detection rules have been stored in the fraud rules database 24. Fraud detection rules may be updated (e.g., replaced, altered, and/or added) from time to time to accommodate changes in fraudulent behavior, issuer bank policy, and the like. The updated fraud detection rules may supersede at least one of the fraud detection rules already stored in the fraud rules database 24, such that the superseded fraud detection rule may be deleted from the fraud rules database 24. The updated fraud detection rule superseding an original fraud detection rule may be different from the original fraud detection rule. The updated fraud detection rules may be stored in the fraud rules database 24. The updated fraud detection rules may include at least one of automatic decline fraud detection rules and case creation fraud detection rules.

With continued reference to FIG. 1, in some non-limiting embodiments or aspects, in response to receiving the updated fraud detection rules, the updated fraud detection rules may be applied to the case records already stored in the case management database 30 which are pending (e.g., the previously described pendency period during which the case record remains unresolved (e.g., before further analysis of the case record for fraud associated with the electronic payment transaction)). Thus, the updated fraud detection rules may be received after the pending case records have been generated and stored in the case management database 30. The updated fraud detection rules may be applied to pending case records by determining whether any of the electronic payment transactions associated with a pending case records satisfy at least one of the updated fraud detection rules.

In some non-limiting embodiments or aspects, at least one of the case management system 26, the rule management system 20, the transaction processing system 16, and the issuer system 18 may automatically determine that an electronic payment transaction does not satisfy the at least one updated fraud detection rule superseding the original fraud detection rule (a case creation fraud detection rule) which the electronic payment transaction satisfied. Upon such a determination (that the electronic payment transaction is a non-fraudulent transaction), at least one of the case management system 26, the rule management system 20, the transaction processing system 16, and the issuer system 18 may cause the case record associated with the electronic payment transaction to be deleted from the case management database 30. Deleting the case record from the case management database 30 may occur before the electronic payment transaction associated with the case record is analyzed by the fraud analysis system 32 (during the pendency thereof), so as to avoid the fraud analysis system from expending computing and other resources (including manual intervention by a customer service representative) to analyze the electronic payment transaction. It will be appreciate that deleting the case record may not completely expunge the case record from the case management database 30 but may remove the case record from the "queue" of case records stored in the case management database 30 to be analyzed by the fraud analysis system 32.

In some non-limiting embodiments or aspects, at least one of the case management system 26, the rule management system 20, the transaction processing system 16, and the issuer system 18 may automatically determine that an electronic payment transaction does not satisfy any updated fraud detection rule. Upon such a determination (that the electronic payment transaction is a non-fraudulent transaction), at least one of the case management system 26, the rule management system 20, the transaction processing system 16, and the issuer system 18 may cause the case record associated with the electronic payment transaction to be deleted from the case management database 30.

In some non-limiting embodiments or aspects, at least one of the case management system 26, the rule management system 20, the transaction processing system 16, and the issuer system 18 may determine that an electronic payment transaction does not satisfy the at least one updated fraud detection rule superseding the original fraud detection rule (a case creation fraud detection rule) which the electronic payment transaction satisfied. However, at least one of the case management system 26, the rule management system 20, the transaction processing system 16, and the issuer system 18 may determine that the electronic payment transaction satisfies a second updated fraud detection rule different from the updated fraud detection rule superseding the original fraud detection rule satisfied by the electronic payment transaction. The second updated fraud detection rule may be an automatic decline fraud detection rule, such that it is determined that the electronic payment transaction is a fraudulent transaction. The case record may be deleted from the case management database 30 so that the fraud analysis system 32 does not further analyze the case record. The electronic payment transaction associated with the deleted case record and satisfying the second updated fraud detection rule (an automatic fraud detection rule) may be declined and/or an action may be initiated by the system 100 to reverse processing of the electronic payment transaction and/or redress the charges associated therewith applied to the user's account.

Figure 3:
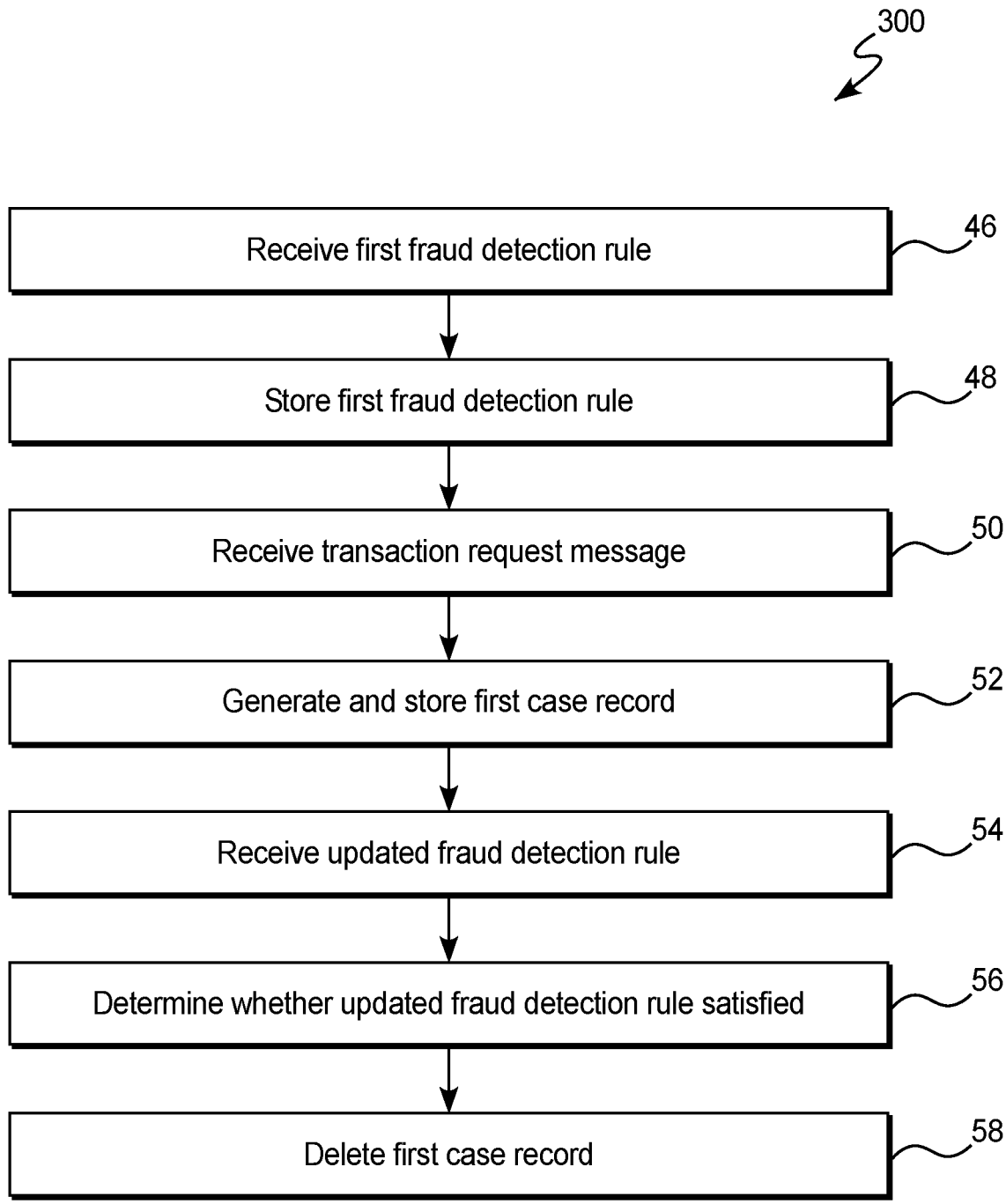
FIG. 3 shows a step diagram of a method for processing a potentially fraudulent electronic payment transaction according to some non-limiting embodiments or aspects.

Referring to FIG. 3, a method 300 is shown for processing a potentially fraudulent electronic payment transaction according to some non-limiting embodiments or aspects. At a step 46, the rule management system may receive from the issuer system, at least one first fraud detection rule configured to identify a potentially fraudulent electronic payment transaction. At a step 48, the rule management system may store the at least one fraud detection rule in the fraud rules database. At a step 50, at least one of the transaction processing system, the issuer system, the rule management system, and the case management system may receive (directly or indirectly), from the merchant system, a transaction request message associated with a first transaction.

At a step 52, in response to determining that the first transaction is a potentially fraudulent transaction based on the first transaction satisfying the at least one first fraud detection rule stored in the fraud rules database, at least one of the transaction processing system, the issuer system, the rule management system, and the case management system may generate and store a first case record associated with the first transaction in a case management database to cause the first transaction to be further analyzed for potential fraud. At a step 54, the rule management system may receive, from the issuer system, at least one updated fraud detection rule superseding the at least one first fraud detection rule.

At a step 56, in response to receiving the at least one updated fraud detection rule and before the first transaction is further analyzed for fraud, at least one of the transaction processing system, the issuer system, the rule management system, and the case management system may apply the at least one updated fraud detection rule to the first transaction to determine whether the first transaction does not satisfy the at least one updated fraud detection rule. At a step 58, in response to determining that the first transaction does not satisfy the at least one updated fraud detection rule, the case management system may delete the first case record from the case management database before the first transaction is further analyzed for fraud.

Figure 4:
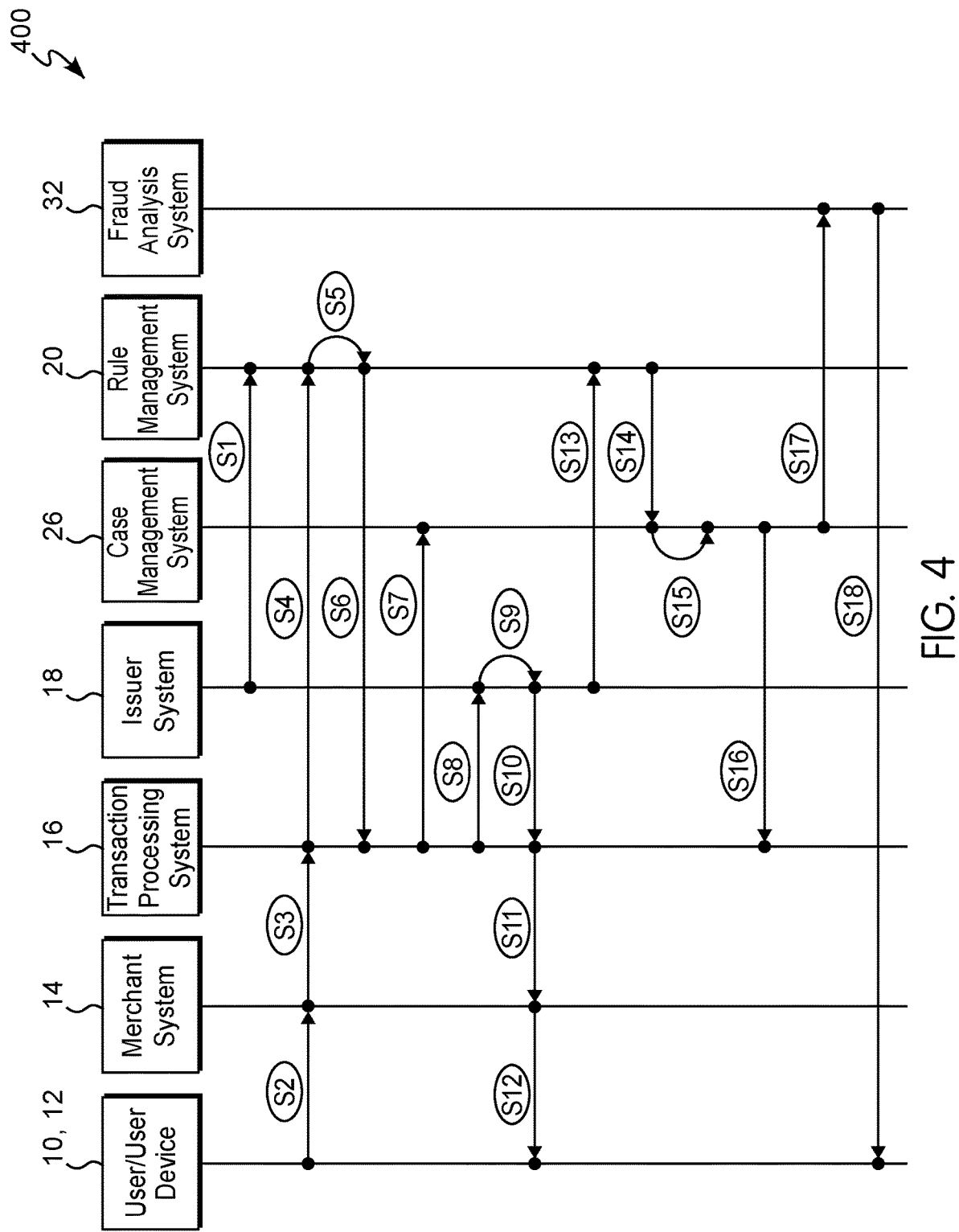
FIG. 4 shows a process flow diagram of a method for processing a potentially fraudulent electronic payment transaction according to some non-limiting embodiments or aspects.

Referring to FIG. 4, a method 400 is shown for processing a potentially fraudulent electronic payment transaction according to some non-limiting embodiments or aspects. At a step S1, the issuer system 18 may generate fraud detection rules and communicate the fraud detection rules to the rule management system 20. The rule management system 20 may store the fraud detection rules in the fraud rules database.

With continued reference to FIG. 4, at a step S2, the user 10 may initiate an electronic payment transaction with the merchant system 14 using the user device 12 (payment device). At a step S3, the merchant system 14 may communicate a transaction request message to the transaction processing system 16 to initiate processing of the electronic payment transaction. At a step S4, the transaction processing system 16 may communicate with the rule management system 20 to determine whether the electronic payment transaction is a potentially fraudulent electronic payment transaction based on the fraud detection rules stored in the fraud rules database. At a step S5, the rule management system 20 may apply the fraud detection rules stored in the fraud rules database to determine whether the electronic payment transaction is a potentially fraudulent electronic payment transaction. The electronic payment transaction may be determined to be a potentially fraudulent electronic payment transaction if the electronic payment transaction satisfies at least one of the fraud detection rules stored in the fraud rules database. The fraud detection rule satisfied may be a case creation fraud detection rule. At a step S6, the rule management system 20 may communicate the determination to the transaction processing system 16 (and/or the case management system 26) that the electronic payment transaction is a potentially fraudulent electronic payment transaction.

With continued reference to FIG. 4, at a step S7, the transaction processing system 16 may communicate with the case management system 26 to cause the case management system 26 to generate and store a case record associated with the potentially fraudulent electronic payment transaction in the case management database. In some non-limiting embodiments or aspects, the rule management system 20 may communicate with the case management system 26 to cause the case management system 26 to generate and store a case record associated with the potentially fraudulent electronic payment transaction in the case management database.

At a step S8, the transaction processing system 16 may communicate an authorization request to the issuer system 18 to cause the issuer system 18 to make an authorization decision for the electronic payment transaction. At a step S9, the issuer system 18 may determine an authorization decision associated with the electronic payment transaction, which may include approving, approving in part, or declining the electronic payment transaction. At a step S10, the issue system 18 may communicate an authorization response to the transaction processing system 16, the authorization response including the authorization decision. At a step S11, the transaction processing system 16 may communicate a transaction response message to the merchant system 14, the transaction response message including the authorization decision. At a step S12, the merchant system 14 may communicate the authorization decision to the user device 12.

With continued reference to FIG. 4, at a step S13, the issuer system 18 may generate updated fraud detection rules and communicate the updated fraud detection rules to the rule management system 20. The rule management system 20 may store the updated fraud detection rules in the fraud rules database. At least one of the updated fraud detection rules may supersede the original fraud detection rules.

At a step S14, in response to receiving and storing the updated fraud detection rules, the rule management system 20 may communicate with the case management system 26 to apply the updated fraud detection rules to the pending (not yet analyzed by the fraud analysis system 32) case records. The case record stored in the case management database and associated with the electronic payment transaction may be a pending case record. At a step S15, the case management system 26 may apply the updated fraud detection rules to the case record associated with the electronic payment transaction and determine that the electronic payment transaction does not satisfy the updated fraud detection rule superseding the original fraud detection rule satisfied by the electronic payment transaction (and in some scenarios does not satisfy any updated fraud detection rule). Thus, in this non-limiting example, it may be determined that the electronic payment transaction is non-fraudulent. In response to determining that the electronic payment transaction does not satisfy the updated fraud detection rule superseding the original fraud detection rule satisfied by the electronic payment transaction, the case management system 26 may delete the case record associated with the electronic payment transaction from the case management database such that the fraud analysis system 32 does not further analyze the case record.

With continued reference to FIG. 4, at a step S16, the case management system 26 may communicate with the transaction processing system 16 to notify the transaction processing system 16 that the electronic payment transaction is non-fraudulent, which may cause the transaction processing system 16 to further process the electronic payment transaction to completion (e.g., authorization, clearing, settlement). At a step S17, other pending case records stored in the case management database which are still determined to satisfy an updated fraud detection case creation rule may be communicated to the fraud analysis system 32, in turn, for further analysis to cause the fraud analysis system 32 to determine whether each case record is associated with a fraudulent or non-fraudulent electronic payment transaction. At a step S18, the fraud analysis system 32 may communicate with the user device 12 to determine whether certain case records undergoing further analysis thereby are fraudulent or non-fraudulent electronic payment transaction.

In a further, non-limiting embodiments or aspect, a computer program product for processing a potentially fraudulent electronic payment transaction includes at least one non-transitory computer readable medium including program instructions that, when executed by at least one processor, cause the at least one processor to execute one of the previously-described methods. The at least one processor may include at least one of the merchant system 14, the transaction processing system 16, the issuer system 18, the case management system 26, the rule management system 20, and the fraud analysis system 32.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for processing electronic payment transactions, comprising:

generating, with at least one processor of an issuer computing system, a plurality of fraud detection rules comprising at least one automatic decline fraud detection rule and a first case creation fraud detection rule;

electronically communicating the plurality of fraud detection rules to a rules processor associated with a computing device of a case management system;

storing, with the at least one processor, in a fraud rules database associated with the computing device of the case management system, the plurality of fraud detection rules;

receiving, with the at least one processor of the issuer computing system, a plurality of transaction requests, wherein the requests comprise requests to authorize transactions initiated in real time by a computing device associated with one or more merchants;

determining, with the at least one processor of the issuer computing system, whether to authorize each transaction request of the plurality of transaction requests based on the rules processor processing each transaction based on the plurality of fraud detection rules, wherein the rules processor is caused to:

determine whether each transaction satisfies the first case creation fraud detection rule or the at least one automatic decline fraud detection rule, generate a case record for each transaction determined to satisfy the first case creation fraud detection rule, wherein each case record indicates that its respective transaction requires further analysis to determine if the transaction is fraudulent, automatically decline each transaction determined to satisfy the at least one automatic decline fraud detection rule, and store the case record for each transaction determined to satisfy the first case creation fraud detection rule in a fraud processing queue such that the fraud processing queue comprises a first plurality of queued transactions that were not automatically declined and have not been authorized, the first plurality of queued transactions corresponding to a first plurality of case records, wherein each case record is stored in a data structure;

generating, with the at least one processor of the issuer computing system, at least one second fraud detection rule comprising a second case creation fraud detection rule that supersedes the first case creation fraud detection rule; and communicating in real time the at least one second fraud detection rule to the rules processor before the first plurality of queued transactions are further analyzed, the at least one second fraud detection rule configured to cause the rules processor to:

determine whether each case record in the fraud processing queue satisfies the second case creation fraud detection rule,
delete each case record in the fraud processing queue that does not satisfy the second case creation fraud detection rule, and
further analyze the remaining case records in the fraud processing queue that are not deleted.

2. The method of claim 1, further comprising:
automatically transmitting, with the at least one processor of the issuer computing system, a communication to a computing device to present an inquiry a user, the communication identifying a specific transaction.

3. The method of claim 2, further comprising:
receiving, with the at least one processor of the issuer computing system, a response to the inquiry; and
determining that the specific transaction is fraudulent based on the response.

4. The method of claim 1, wherein the second case creation fraud detection rule comprises an update to the first case creation fraud detection rule.

5. The method of claim 1, further comprising analyzing, with the at least one processor of the issuer computing system, case records remaining in the fraud processing queue based on historical transaction data after a plurality of case records are deleted.

6. The method of claim 1, further comprising:
determining, with the at least one processor of the issuer computing system, an authorization decision for a transaction based on the case management system; and
communicating an authorization response message containing the authorization decision to a transaction processing system.

7. The method of claim 1, wherein the issuer computing system comprises the rules processor and case management system.

8. A system for processing an electronic payment transaction, comprising at least one processor of an issuer computing system, the at least one processor programmed or configured to:
generate a plurality of fraud detection rules comprising at least one automatic decline fraud detection rule and a first case creation fraud detection rule;
electronically communicate the plurality of fraud detection rules to a rules processor associated with a case management system;
store, in a fraud rules database associated with the computing device of the case management system, the plurality of fraud detection rules;
receive a plurality of transaction requests, wherein the requests comprise requests to authorize transactions initiated in real time by a computing device associated with one or more merchants;
determine whether to authorize each transaction request of the plurality of transaction requests based on the rules processor processing each transaction based on the plurality of fraud detection rules, wherein the rules processor is caused to:
determine whether the transaction satisfies the first case creation fraud detection rule or the at least one automatic decline fraud detection rule,
generate a case record for each transaction determined to satisfy the first case creation fraud detection rule, wherein each case record indicates that its respective transaction requires further analysis to determine if the transaction is fraudulent,
automatically decline each transaction determined to satisfy the at least one automatic decline fraud detection rule, and
store the case record for each transaction determined to satisfy the first case creation fraud detection rule in a fraud processing queue such that the fraud processing queue comprises a first plurality of queued transactions that were not automatically declined and have not been authorized, the first plurality of queued transactions corresponding to a first plurality of case records, wherein each case record is stored in a data structure; and
generate at least one second fraud detection rule comprising a second case creation fraud detection rule that supersedes the first case creation fraud detection rule;
communicate in real time the at least one second fraud detection rule to the rules processor before the first plurality of queued transactions are further analyzed, the at least one second fraud detection rule configured to cause the rules processor to:
determine whether each case record in the queue satisfies the second case creation fraud detection rule,
delete each case record in the queue that does not satisfy the second case creation fraud detection rule, and
further analyze the remaining case records in the fraud processing queue that are not deleted.

9. The system of claim 8, further comprising:
automatically transmit a communication to a computing device to present an inquiry a user, the communication identifying a specific transaction.

10. The system of claim 9, wherein the at least one processor is further programmed or configured to:
receive a response to the inquiry; and
determine that the specific transaction is fraudulent based on the response.

11. The system of claim 8, wherein the second case creation fraud detection rule comprises an update to the first case creation fraud detection rule.

12. The system of claim 8, wherein the at least one processor is further programmed or configured to analyze case records remaining in the fraud processing queue based on historical transaction data after a plurality of case records are deleted.

13. The system of claim 8, wherein the at least one processor is further programmed or configured to:
determine an authorization decision for a transaction based on the case management system; and
communicate an authorization response message containing the authorization decision to a transaction processing system.

14. The system of claim 8, wherein the issuer computing system comprises the rules processor and case management system.

15. A computer program product for processing an electronic payment transaction, comprising at least one non-transitory computer-readable medium including one or more instructions that, when executed by at least one processor of an issuer computing system, cause the at least one processor to:
generate a plurality of fraud detection rules comprising at least one automatic decline fraud detection rule and a first case creation fraud detection rule;
electronically communicate the plurality of fraud detection rule to a rules processor associated with a case management system;

store, in a fraud rules database associated with the computing device of the case management system, the plurality of fraud detection rules;

receive a plurality of transaction requests, wherein the requests comprise requests to authorize transactions initiated in real time by a computing device associated with one or more merchants;

determine whether to authorize each transaction request of the plurality of transaction requests based on the rules processor processing each transaction based on the plurality of fraud detection rules, wherein the rules processor is caused to:
- determine whether the transaction satisfies the first case creation fraud detection rule or the at least one automatic decline fraud detection rule,
- generate a case record for each transaction determined to satisfy the first case creation fraud detection rule, wherein each case record indicates that its respective transaction requires further analysis to determine if the transaction is fraudulent,
- automatically decline each transaction determined to satisfy the at least one automatic decline fraud detection rule, and
- store the case record for each transaction determined to satisfy the first case creation fraud detection rule in a fraud processing queue such that the fraud processing queue comprises a first plurality of queued transactions that were not automatically declined and have not been authorized, the first plurality of queued transactions corresponding to a first plurality of case records, wherein each case record is stored in a data structure;

generate at least one second fraud detection rule comprising a second case creation fraud detection rule that supersedes the first case creation fraud detection rule; and communicate in real time the at least one second fraud detection rule to the rules processor before the first plurality of queued transactions are further analyzed, the at least one second fraud detection rule configured to cause the rules processor to:
- determine whether each case record in the fraud processing queue satisfies the second case creation fraud detection rule,
- delete each case record in the fraud processing queue that does not satisfy the second case creation fraud detection rule, and
- further analyze the remaining case records in the fraud processing queue that are not deleted.

16. The computer program product of claim 15, wherein the one or more instructions are further configured to cause the at least one processor to automatically transmit a communication to a computing device to present an inquiry a user, the communication identifying a specific transaction.

17. The computer program product of claim 16, wherein the one or more instructions are further configured to cause the at least one processor to:
receive a response to the inquiry; and
determine that the specific transaction is fraudulent based on the response.

18. The computer program product of claim 15, wherein the second case creation fraud detection rule comprises an update to the first case creation fraud detection rule.

19. The computer program product of claim 15, wherein the one or more instructions are further configured to cause the at least one processor to:
determine an authorization decision for a transaction based on the case management system; and
communicate an authorization response message containing the authorization decision to a transaction processing system.

\* \* \* \* \*

UNITED STATES PATENT AND TRADEMARK OFFICE
CERTIFICATE OF CORRECTION

PATENT NO. : 11,893,586 B2
APPLICATION NO. : 17/484677
DATED : February 6, 2024
INVENTOR(S) : Deepam Tiwan Page 1 of 1

It is certified that error appears in the above-identified patent and that said Letters Patent is hereby corrected as shown below:

In the Claims

Column 21, Line 13, Claim 2, after "inquiry" insert -- to --

Column 21, Line 60, Claim 8, delete "the" and insert -- each --

Column 22, Line 23, Claim 8, after "the" insert -- fraud processing --

Column 22, Line 25, Claim 8, after "the" insert -- fraud processing --

Column 22, Line 29, Claim 9, delete "further comprising" and insert -- wherein the at least one processor of the issuer system is further programmed or configured to --

Column 22, Line 31, Claim 9, after "inquiry" insert -- to --

Column 22, Line 34, Claim 10, after "processor" insert -- of the issuer system --

Column 22, Line 42, Claim 12, after "processor" insert -- of the issuer system --

Column 22, Line 47, Claim 13, after "processor" insert -- of the issuer system --

Column 24, Line 17, Claim 16, after "inquiry" insert -- to --

Signed and Sealed this
Twenty-ninth Day of July, 2025

Coke Morgan Stewart
*Acting Director of the United States Patent and Trademark Office*